United States Patent
Despres (10) Patent No.: US 10,129,954 B2
(45) Date of Patent: Nov. 13, 2018

(54) ADJUSTABLE LIGHTING IN AN AIRCRAFT BASED ON LOCATION OF MOVABLE OBJECT

(71) Applicant: IDD Aerospace Corporation, Redmond, WA (US)

(72) Inventor: Thierry Despres, Bellevue, WA (US)

(73) Assignee: IDD Aerospace Corporation, Redmond, WA (US)

(*) Notice: Subject to any disclaimer, the term of this patent is extended or adjusted under 35 U.S.C. 154(b) by 90 days.

(21) Appl. No.: 15/165,764

(22) Filed: May 26, 2016

(65) Prior Publication Data
US 2016/0353551 A1    Dec. 1, 2016

Related U.S. Application Data

(60) Provisional application No. 62/166,409, filed on May 26, 2015.

(51) Int. Cl.

| | | |
|---|---|---|
| B60Q 3/18 | (2017.01) | |
| H05B 37/02 | (2006.01) | |
| B64D 11/00 | (2006.01) | |
| F21V 23/04 | (2006.01) | |
| B60Q 3/43 | (2017.01) | |
| B60Q 3/47 | (2017.01) | |

(52) U.S. Cl.
CPC .......... *H05B 37/0227* (2013.01); *B60Q 3/43* (2017.02); *B60Q 3/47* (2017.02); *B64D 11/00* (2013.01); *F21V 23/0471* (2013.01); *H05B 37/0272* (2013.01); *B64D 2011/0038* (2013.01)

(58) Field of Classification Search
CPC .......... H05B 37/0227; H05B 37/0272; H05B 37/0245; B64D 11/00; B64D 2011/0038; B64D 2011/0053; B60Q 3/43; B60Q 3/47; B60Q 3/44; B60Q 3/18; B60Q 3/20; F21V 23/0471; Y02B 20/44; Y02B 20/46; Y02B 20/48
See application file for complete search history.

(56) References Cited

U.S. PATENT DOCUMENTS 8,655,593 B1 * 2/2014 Davidson ............. G08G 1/0112
                                                                    188/79.54
9,296,333 B2 * 3/2016 Rittner ..................... G06F 3/00
(Continued)

FOREIGN PATENT DOCUMENTS

EP          1408276         4/2004

OTHER PUBLICATIONS

International Patent Application No. PCT/US2016/034341, Search Report and Written Opinion dated Sep. 21, 2016.

*Primary Examiner* — Haissa Philogene
(74) *Attorney, Agent, or Firm* — Kilpatrick Townsend & Stockton LLP; Dean W. Russell; Anthony L. Guebert (57) ABSTRACT

Aircraft lighting systems that are adjustable based on a location of a movable object are described. The lighting systems can include one or more sensors and a processing device. The one or more sensors can be positioned in an aircraft for determining location data of a movable object relative to the aircraft. The processing device can be communicatively coupled to at least one of the one or more sensors for receiving the location data from the at least one sensor and the processing device can adjust lighting in one or more sections of the aircraft based on the location data.

17 Claims, 5 Drawing Sheets

(56) References Cited

U.S. PATENT DOCUMENTS

| | | | |
|---|---|---|---|
| 9,308,920 B2 * | 4/2016 | Konigsberg | B60W 50/08 |
| 2007/0236926 A1 | 10/2007 | Guard et al. | |
| 2009/0112407 A1 | 4/2009 | Kneller et al. | |
| 2010/0012780 A1 | 1/2010 | Kohlmeier-Beckmann et al. | |
| 2014/0103814 A1 | 4/2014 | Both | |
| 2014/0313751 A1 | 10/2014 | Abel | |
| 2015/0251594 A1 * | 9/2015 | Timm | B64D 11/00 |
| | | | 362/471 |
| 2016/0152178 A1 * | 6/2016 | Peterson | B60Q 3/80 |
| | | | 315/77 |

* cited by examiner

ADJUSTABLE LIGHTING IN AN AIRCRAFT BASED ON LOCATION OF MOVABLE OBJECT

CROSS REFERENCE TO RELATED APPLICATION

This application is related to and claims priority benefits from U.S. Provisional Application Ser. No. 62/166,409 ("the '409 application"), filed on May 26, 2015, entitled "Lighting System that Interacts with Movable Object." The '409 application is hereby incorporated in its entirety by this reference.

TECHNICAL FIELD

The present disclosure relates generally to a lighting system and, more particularly (although not necessarily exclusively), to a lighting system for an aircraft that can be adjusted based on the location of a movable object.

BACKGROUND

An aircraft can include lighting in the interior of the cabin. The lighting can include overhead lighting for passengers (e.g., reading lighting), pathway lighting, and signage (e.g., lavatory signs and exit signs). In some examples, the lighting may be adjustable between on and off. In additional or alternative examples, the brightness, color, and/or angle of the lighting can be adjusted. Different lighting conditions may be desired, for example, based on the time of day and activity of a passenger or crew member.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Disclosed herein is an aircraft lighting system that includes a processing device for adjusting or controlling one or more lighting units based on the location of a movable object. In some aspects, the lighting system can include one or more sensors positionable in the aircraft for determining the location data of the movable object relative to the aircraft. The processing device can be communicatively coupled to at least one sensor of the one or more sensors for receiving the location data from the at least one sensor. In additional or alternative aspects, the lighting system can also include a remote device affixed to or held by the movable object. The processing device can be communicatively coupled to the remote device for receiving the location data from the remote device. In additional or alternative aspects, the lighting system can include one or more sensors that communicate with the remote device to determine location data about the movable object. The processing device can determine a location of the movable object based on the location data and adjust one or more lighting units based on the determined location.

In some examples, the one or more sensors each include a communication circuit for communicating a signal between one or more sensors and a remote device that can be coupled to the movable object.

In some examples, the system can further include the remote device for transmitting the signal with type data about a type of the movable object. The system can additionally adjust the lighting in the section of the aircraft based on the type data.

In some examples, the type of the movable object can include at least one of a passenger, a crew member, a trolley cart, or a robot.

In some examples, the signal is a response signal. Furthermore, each communication circuit can be configured to transmit a request signal to the remote device for powering the remote device such that the remote device transmits the response signal.

In some examples, the request signal can instruct the remote device to transmit the response signal at a first time. The sensors can further determine the location data based on a comparison of the first time and a second time at which the response signal was received by the one or more sensors.

In some examples, adjusting the lighting in the section of the aircraft can include activating a set of overhead lights above passenger seats nearest to the location of the movable object.

In some examples, adjusting the lighting in the section of the aircraft can include activating signage in a part of the aircraft nearest the location of the movable object.

In some examples, the location can be a current location and the system can further include a storage device for storing a past location of the movable object. The processing device can further be configured to adjust additional lighting in an additional section of the aircraft based on the current location and the past location.

In some examples, at least one sensor of the one or more sensors can be a proximity sensor for detecting the location of the movable object by detecting that the movable object is proximate to the proximity sensor. In other examples, at least one sensor of the one or more sensors can be a camera.

Also disclosed is a method that includes receiving a signal from a remote device coupled to a movable object in an aircraft. The method can further include determining a location of the movable object based on the signal. And, the method can include adjusting lighting in one or more sections of the aircraft based on the location of the movable object.

In some examples, the signal can include type data about a type of the movable object. Adjusting the lighting in the section of the aircraft can further be based on the type data.

In some examples, the signal can be a response signal. The method can further include transmitting a request signal to the remote device that can power the remote device such that the remote device can transmit the response signal.

In some examples, the request signal can instruct the remote device to transmit a response signal at a first time. The method can further include observing a second time at which the response signal is received by a receiver. And, the location of the movable object can be determined based on a difference between the first time and the second time.

In some examples, receiving the signal from the remote device can include receiving the signal by more than one receiver. And, determining the location of the movable object can include comparing when the signal was received at each sensor.

In some examples, adjusting lighting in one or more sections of the aircraft can include activating at least one of a set of overhead lights above passenger seats nearest the location of the movable object, a sign nearest the location of the movable object, or pathway lights nearest the location of the movable object.

In some examples, the method can further include storing the location of the movable object. And, adjusting lighting in one or more sections of the aircraft can be further based on a past location of the movable object.

Also disclosed is a non-transitory computer-readable medium having instructions stored thereon that can be executable by a processing device to perform operations. The operations can include determining a location of a movable object in an aircraft. And, the operations can further include adjusting lighting in one or more sections of the aircraft based on the location of the movable object.

In some examples, the movable object can be coupled to a radio-frequency identification tag. And, determining the location of the movable object can include receiving a signal from the radio-frequency identification tag.

In some examples, the signal can include type data about the type of movable object and the type data can be used to adjust the lighting in the section of the aircraft.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Disclosed is a lighting system that is adjustable based on a location of a movable object. An adjustable lighting system in an aircraft can detect the location of a movable object within the aircraft and can adjust lighting in one or more sections of the aircraft based on the location of the movable object. For example, as a flight attendant with a trolley cart approaches a passenger, the adjustable lighting system can detect the movable object (e.g., the flight attendant and/or the trolley cart) and adjust the lights above or proximate the passenger accordingly.

Although the lighting system can be used with passenger aircrafts, the lighting system is by no means limited to aircrafts. Rather, the lighting system may be used in any vehicle or other lighting environment as desired.

In some aspects, the adjustable lighting system can adjust or control any lighting in an aircraft including, but not limited to, overhead lighting, galley lighting, crew rest lighting, passenger lighting, lavatory lighting, and pathway lighting. In additional or alternative aspects, the lighting can include a sign (e.g., an exit sign or a lavatory occupancy sign). For example, the adjustable lighting system can detect a trolley cart moving through the aircraft and activate the lavatory occupancy sign to discourage passengers from accessing the lavatory while the trolley is in the aisle. In some aspects, the adjustable lighting system can activate or deactivate a light, brighten or dim the light, change the color of the light, and/or change the direction the light is facing. In some examples, the adjustable lighting system can monitor crew members serving food and brighten the lighting above only those passengers that have been served.

In some aspects, the lighting can be controlled by instructing the lighting to perform a specific lighting scenario. A lighting scenario can include a set of instructions for a lighting unit including whether to be activated or deactivated, the brightness of the light, the color of the light, and/or the direction the light is facing. In some examples, the lighting scenario can be for a section of lighting units and include sub-scenarios with instructions for specific lighting units (.e.g., scenario A includes scenario A.1 for lighting unit 1, A.2 for lighting unit 2, etc.). In some examples, the lighting units can include embedded memory with the lighting scenarios or sub-scenarios stored therein such that a processing device can send instructions to run a specific lighting scenario. This configuration limits the bandwidth of the signal to be sent to each lighting unit. In additional or alternative examples, the processing device can maintain a database of lighting scenarios and when the lighting scenario is appropriate for individual lighting units. The processing device can further store a serial number or IP address for each lighting unit and each lighting unit can include memory for storing the lighting unit's own serial number or IP address. Each lighting unit will then play the scenario corresponding to its serial number or IP address.

The adjustable lighting system can include a processing device communicatively coupled to a location system. In some aspects, the location system includes one or more sensors. The one or more sensors can be stationary or mobile devices. The adjustable lighting system can include enough sensors to provide sufficient resolution of the cabin in relation to the spatial resolution of the lighting scenarios. For example, if a lighting scenario includes increasing the lighting intensity at one specific row of seats, then the number of sensors and positioning of the sensors must be sufficient to ensure spatial resolution of at least one row.

The one or more sensors can determine location data about the movable object and transmit the data to the processing device. The one or more sensors can include a wireless or wired connection to the processing device for communicating the location data. The processing device can use the location data to determine the location of the movable object. In some aspects, the one or more sensors can include proximity sensors and the location data can include notification that the movable object is proximate a specific proximity sensor. In additional or alternative aspects, the one or more sensors can include cameras for capturing images of the movable object that the processing device can use to determine the location of the movable object.

In additional or alternative aspects, the location system can include a remote device coupled to the movable object. The remote device can determine location data about the movable object or be used by the location system to determine location data about the movable object. For example, the one or more sensors can include receivers for receiving signals from the remote device. The remote device can include a passive communication circuit (e.g., a radio-frequency identification ("RFID") tag) for transmitting a signal that can be received by the one or more sensors to determine location data. In some examples, the location data can include the time the signal was received at each sensor and the processing device can determine the location of the movable object based on comparing the time the signal was received at each sensor. In additional or alternative examples, the remote device can determine location data and transmit the location data to a sensor.

In additional or alternative aspects, the sensors can include a communication circuit for transmitting signals from the sensors to the remote device. In some examples, the sensors can include a passive communication circuit (e.g., an RFID tag) for transmitting a signal in response to a signal from the remote device. In additional or alternative examples, the signal transmitted by the sensors can be used by the remote device to determine the location data, and the remote device can transmit the location data to the processing device. In some aspects, at least one sensor can be movable and can provide a signal to the location system for updating the sensor's location. In additional or alternative aspects, one of the sensors can determine changes in the sensor's location based on the detection of nearby sensors and provide location data to the location system or a processing device. In some examples, at least one of the sensors can be a remote device for coupling to a movable object and can be used to determine the location of the movable object.

In some aspects, the movable object can be a person or a thing. For example, the movable object can be a passenger, a crew member, a trolley cart, a robot, a crew member's handheld device, a passenger's handheld device, a badge, or a ticket. In additional or alternative aspects, the adjustable lighting system can further adjust the lights based on the type of movable object. In some aspects, the sensors can include receivers, emitters, transmitters, transceivers, motion detectors, proximity detectors, light detectors, or cameras. In additional or alternative aspects, the sensors can be passive devices such as RFID tags or spatial landmarks for recognition by the location system. In some aspects, the remote device can include or be a part of a personal computer, mobile phone, RFID tag, a Near Field Communication ("NFC") circuit, Bluetooth circuit, or wireless transceiver.

In some aspects, the adjustable lighting system can further include a scenario programming platform. The scenario programming platform can provide a user friendly display for adjusting the lighting scenarios and for checking the lighting. The platform can also be used to display the location of particular movable objects, the ID of remote devices, sensors, and lighting units, and provide a virtual mock-up of the locations of the sensors. In some aspects, the adjustable lighting system can include a maintenance mode for checking the function of the lighting units. While in maintenance mode, a light acquisition device can identify differences in lighting provided by lighting units and indicate adjustments that can be made to provide uniform lighting. For example, different lighting units can develop different brightness and color due to aging, but the adjustable lighting system can provide adjustments to individual lighting units to ensure uniform lighting.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
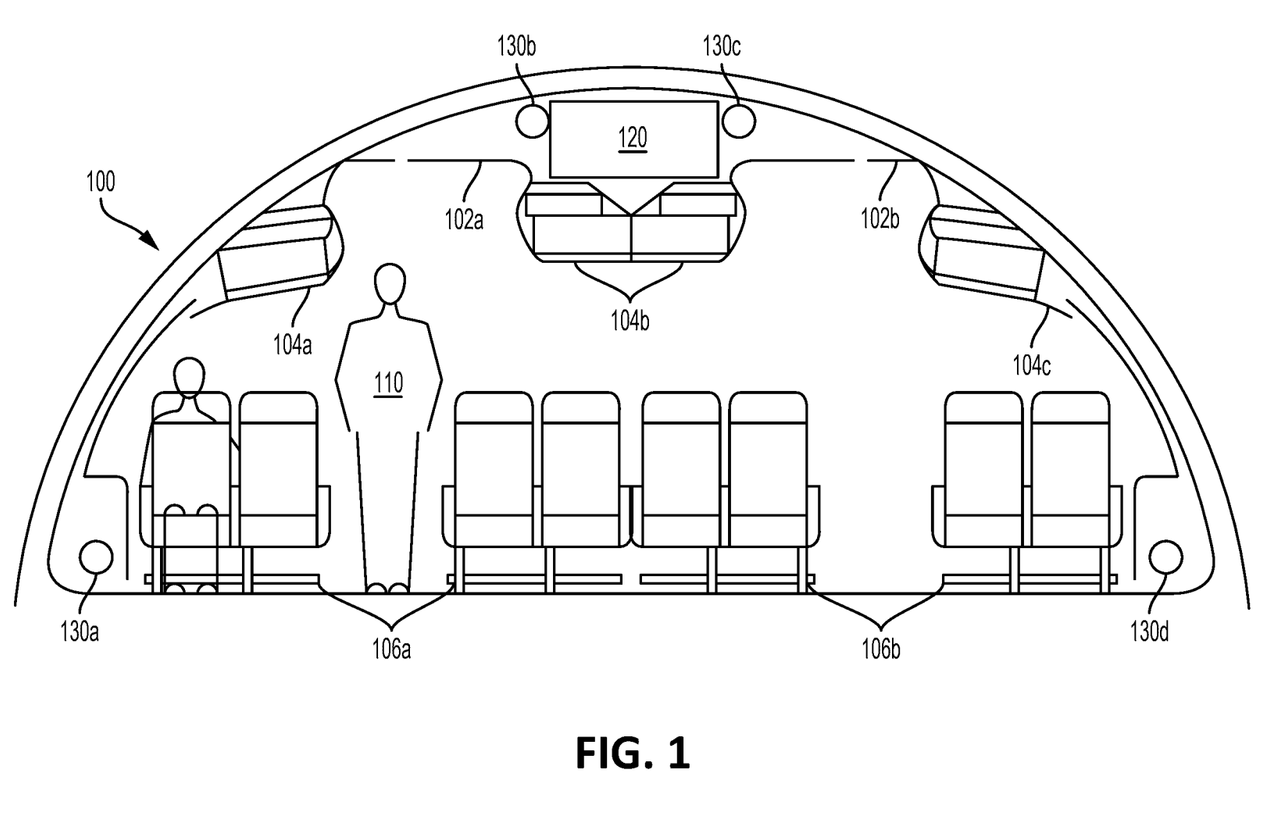
FIG. 1 is a schematic sectional view of an interior of an aircraft with an adjustable lighting system according to an example.

FIG. 1 is a schematic sectional view of an interior of an aircraft 100 with an adjustable lighting system. The aircraft can include cabin lighting 102*a-b*, passenger lighting 104*a-c*, and pathway lighting 106*a-b*. The adjustable lighting system can include a processing device 120 communicatively coupled to sensors 130*a-d*. The sensors 130*a-d* can determine location data about a movable object 110 (e.g., a crew member) and transmit the location data to the processing device 120. The processing device 120 can use the location data to determine the location of the movable object 110. The processing device 120 can further adjust any combination of cabin lighting 102*a-b*, passenger lighting 104*a-c*, and pathway lighting 106*a-b* based on the location of the movable object 110.

For example, processing device 120 can determine the movable object 110 is in the left pathway (as depicted in FIG. 1) and activate overhead lighting 102*a* and/or pathway lighting 106*a*. In additional or alternative examples, the processing device 120 can determine the movable object 110 is in the left pathway and dim overhead lighting 102*b* and/or pathway lighting 106*b*. In additional or alternative examples, the processing device 120 can adjust the color, intensity, and angle of lighting in aircraft 100 based on the location of the movable object 110.

In some aspects, sensors 130*a-d* include proximity sensors that can detect the presence of a movable object. In some examples, a proximity sensor can include a processing device and can adjust lighting in one or more sections of the aircraft proximate the proximity sensor based on detecting the movable object 110. Although FIG. 1 depicts processing device 120 as separate from the sensors, in some examples each sensor can include a processing device that can adjust lighting in one or more sections of the aircraft associated with the sensor.

In additional or alternative aspects, a remote device can be coupled to the movable object 110. The remote device can include a communication circuit for transmitting a signal receivable by sensors 130*a-d*. The sensors can determine location data based on the signal received. In some examples, the communication circuit can be an RFID tag, a NFC circuit, a Bluetooth circuit, or any wireless transceiver. In additional or alternative examples, the sensors can transmit a request signal to the communication circuit requesting a response signal. In some additional examples, the request signal can instruct the communication circuit to send the response signal at a specific time. The sensors can record the time the response signal is received at the sensor and compare the transmission time and the received time to determine location data.

Although FIG. 1 depicts the movable object 110 as a person, a movable object can be any person or thing that can move or be moved relative the aircraft 100. For example, a movable object could include a trolley cart, a passenger, a crew member, luggage, a book, a tray table, or a ticket. Furthermore, FIG. 1 depicts four sensors 130*a-d* communicatively coupled to one processing device 120 but an adjustable lighting system can include any number of sensors communicatively coupled to any number of processing devices, and these sensors can be located anywhere within the aircraft. In some aspects, sensors can be passive RFID tags positioned throughout an aircraft to create a grid. In some examples, a remote device can acquire location data from communication or recognition of nearby sensors. The remote device can transmit the location data to a processing device for determining the location of the movable object. The remote device can further transmit a unique ID to the processing device such that the processing device can adjust lighting in the aircraft for one or more remote devices and adjust the lighting based on the ID. In additional or alternative examples, the remote device can transmit a signal and ID to nearby sensors, and each sensor can transmit the signal and ID to the processing device.

In some aspects, a remote device can be assigned an initial location, and a current location can be calculated based on movement of the device. For example, accelerometers could be placed both on the remote device and the structure of the aircraft and used, along with the initial location, to determine the current location.

In some examples, each section or sections of lighting can be communicatively coupled to a dedicated processing device that is communicatively coupled to one or more sensors. The overhead lighting 102*a-b*, passenger lighting 104*a-c*, and pathway lighting 106*a-b* are only examples of some of the lighting that can be adjusted by an adjustable lighting system. In additional or alternative examples, an adjustable lighting system can control or adjust signs (e.g., an exit sign or a lavatory occupancy sign) or any other lighting located in the aircraft 100.

Figure 2:
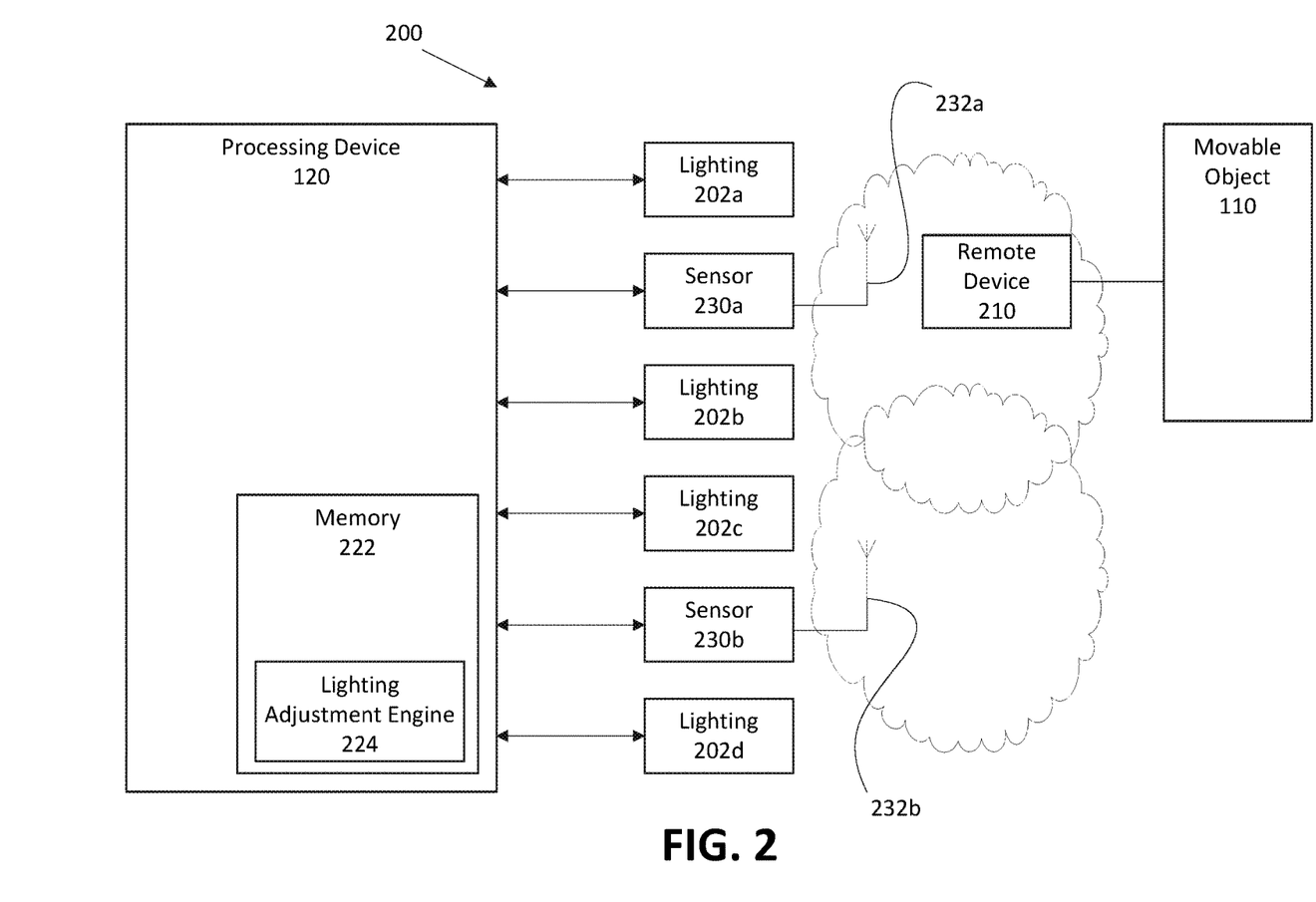
FIG. 2 is a block diagram of an adjustable lighting system and a remote device coupled to a movable object according to an example.

FIG. 2 is a block diagram of an adjustable lighting system 200 and a remote device 210 coupled to a movable object 110. The adjustable lighting system 200 includes a processing device 120 communicatively coupled to lighting 202*a-d* and sensors 230*a-b*. The sensors 230*a-b* are each communicatively coupled to an antenna 232*a-b*. In some aspects, the sensors 230*a-b* can use the antennas 232*a-b* to receive a signal transmit by the remote device 210. The sensors can determine location data about the movable object 110 from the signal and transmit the location data to the processing device 120. For example, the signal can be sent at a predetermined time and the sensors 230*a-b* can each record the time the signal is received such that the time it took the signal to reach each sensor 230*a-b* can be determined.

In some aspects, the signal transmit by the remote device 210 can include information. For example, the signal can include information about the movable object 110 such as the movable object's type (e.g., a passenger, a trolley cart, or a robot). In additional or alternative examples, the signal can include information about the location of the movable object 110.

The processing device 120 can include any number of processors configured for executing program code stored in the memory 222. Examples of the processing device 120 can include a microprocessor, an application-specific integrated circuit ("ASIC"), a field-programmable gate array ("FPGA"), or other suitable processor. In some aspects, the processing device 120 can be a dedicated processing device used for adjusting a section or sections of lighting 202*a-d* based on a location of the movable object 110. In other aspects, the processing device 120 can perform additional functions such as controlling overhead fans or transmitting passenger requests to a flight attendant.

The processing device 120 can include (or be communicatively coupled with) a non-transitory computer-readable memory 222. The memory 222 can include one or more memory devices that can store program instructions. The program instructions can include, for example, a lighting adjustment engine that is executable by the processing device 120 to perform certain operations described herein.

The operations can include determining a location of the movable object 110 in an aircraft. In some aspects, the movable object can be coupled to an RFID tag and determining the location of the movable object 110 can include receiving a signal from the RFID tag. The operations can further include adjusting the lighting 202*a-d* in one or more sections of the aircraft based on the location of the movable object 110. In additional or alternative aspects, a signal from the remote device 210 can include data about the type of movable object to which the remote device 210 is coupled. Adjusting the lighting 202*a-d* in the one or more sections of the aircraft can further be based on the type of movable object 110. The type can be a general category, for example, classifying the movable object 110 as a person or a thing. Additionally or alternatively, the type can be more specific, for example, describing the movable object 110 as a child passenger, a special needs passenger, a crew member, or a trolley cart.

The memory 222 can also store past locations of the movable object 110. In some aspects, the processing device 120 can adjust the lighting 202*a-d* in one or more sections of the aircraft based both on the current location of the movable object 110 and one or more past locations of the movable object 110. For example, the processing device 120 can determine the current location of the movable object 110 is different than its past location, brighten the lighting 202*a-d* in a section of the aircraft near the current location and dim the lighting 202*a-d* in a section of the aircraft near the past location. In additional or alternative aspects, the processing device 120 can determine the direction the movable object 110 is moving and adjust lighting 202*a-d* in a section of the aircraft further based on the direction the movable object 110 is travelling. In additional or alternative aspects, the processing device 120 can estimate a future location of the movable object 110 based on its current location and past location and adjust lighting 202*a-d* in a section of the aircraft further based on the future location. For example, the processing device 120 can detect the movable object 110 (e.g., a passenger) moving towards the rear of the plane and estimate that the movable object 110 is headed to the lavatory. The processing device 120 can activate the pathway lighting to the lavatory, brighten the lavatory occupancy sign, and activate the lavatory lighting based on the estimate.

Figure 5:
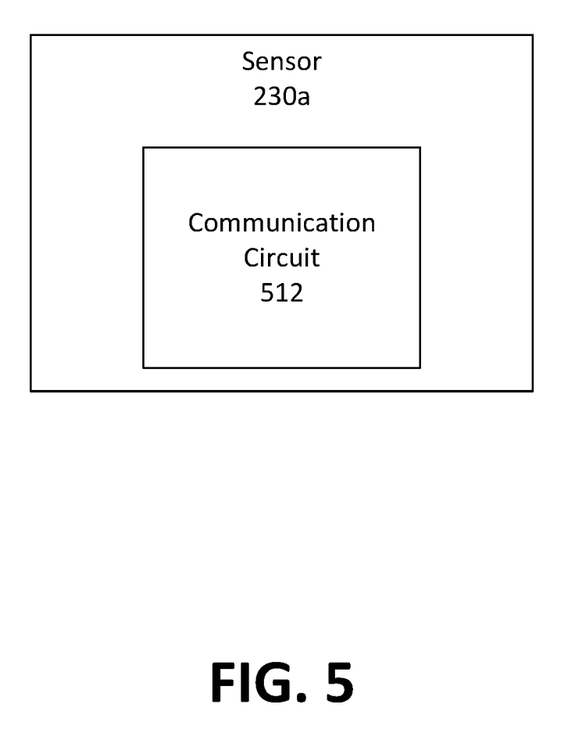
FIG. 5 is a block diagram of a sensor according to an example.

Although FIG. 2 depicts one example of an adjustable lighting system 200, other implementations are possible. In some examples, the processing device 120 is embedded within the sensors 230*a-b* or lighting 202*a-d*. In additional or alternative examples, the processing device 120, remote device 210, lighting 202*a-d*, and sensors 230*a-d* can each include (or be communicatively coupled to) a processing device, a communication circuit, a storage device, a power supply, or an antenna. For example, each lighting 202*a-d* can include an embedded memory for storing identification information and lighting scenarios. As another example, FIG. 5 illustrates the sensor 230*a* with a communication circuit 512. In additional or alternative aspects, the remote device 210 can include an antenna for communicatively coupling directly to the processing device 120. In additional or alternative aspects, the remote device 210 can determine location data about the movable object 110 and transmit the location data directly to the processing device 120. For example, the remote device 210 can receive signals from sensors 230a-b and use the received signals to determine the location data.

Figure 3:
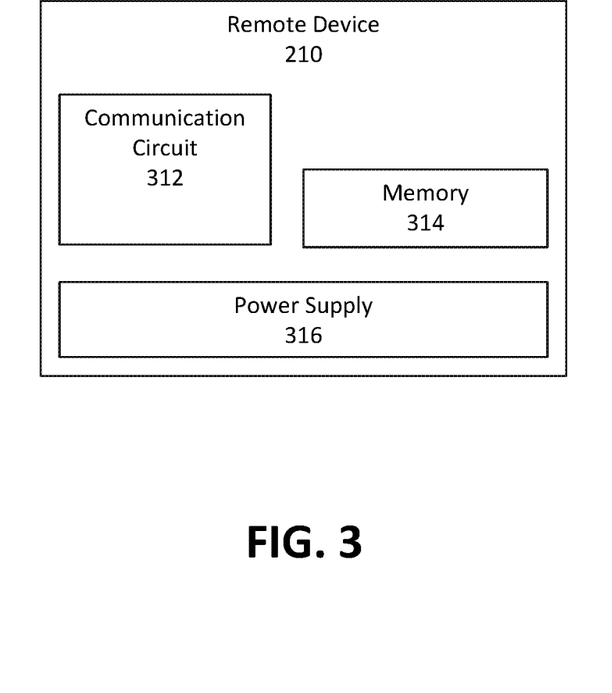
FIG. 3 is a block diagram of a device that can be coupled to a movable object according to an example.

FIG. 3 is a block diagram of a remote device 210 that can be coupled to a movable object in an aircraft. The remote device 210 can include a communication circuit 312, memory 314, and a power supply 316. The communication circuit 312 can be powered by the power supply 316 to transmit a signal receivable by one or more sensors in the aircraft. The communication circuit 312 can further be communicatively coupled to the memory 314 such that data stored in memory 314 can be transmitted as part of the signal. In some aspects, the data can include information about the movable object to which the remote device 210 can be coupled. In additional or alternative aspects, signals received by the communication circuit 312 can instruct that data be written to the memory 314. For example, the remote device 210 can further include a processing device that receives location data from signals received at the communication circuit 312 and uses the location data to determine a location of the movable object and store the location data to memory 314. In additional or alternative aspects, the remote device 210 can be a sensor and can communicatively coupled to an antenna for communicating directly with a processing device of an adjustable lighting system.

The remote device 210 can be an size or shape. The remote device can be coupled to the movable object by any means. In some examples, the remote device can be fastened to a movable object using any suitable fastener, including but not limited to a screw, bolt, rivet, welding, or adhesive. In additional or alternative examples, the remote device 210 may be located in a pocket, badge, or item carried or worn by the movable object.

Although the remote device 210 in FIG. 3 is illustrated as including a power supply 316, in some aspects the remote device 210 can be powered by signals received by the communication circuit 312. For example, the communication circuit 312 can include an RFID tag or an NFC circuit that are powered by received signals. In additional or alternative aspects, a remote device consists of only the communication circuit.

Figure 4:
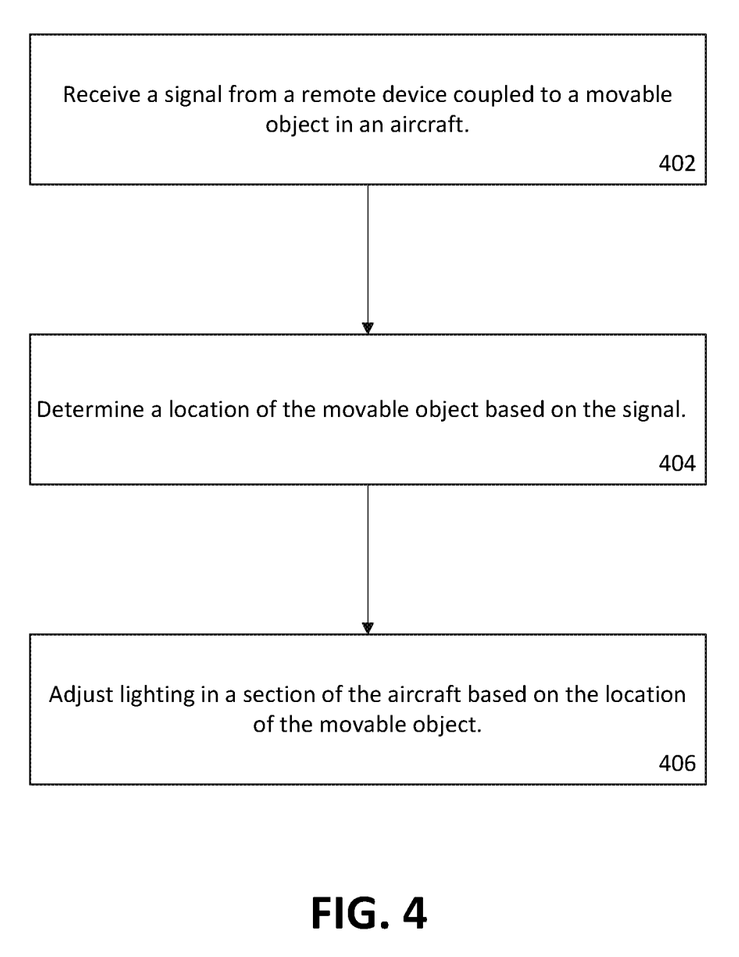
FIG. 4 is a flow chart of a process for adjusting the lighting based on the location of the movable object.

FIG. 4 is a flow chart of an exemplary process for adjusting the lighting in an aircraft based on the location of a movable object. The process can improve the safety and comfort of the aircraft by providing appropriate lighting. For example, the process can increase the lighting around passengers moving through the cabin and dim the lighting in areas of the cabin where passengers are sleeping. The process can also improve the energy efficiency of the aircraft by optimizing the use of the lighting based on the location of the movable object.

In block 402, a signal is received from a remote device coupled to a movable object in an aircraft. In some aspects, the signal received from the remote device is a response signal in response to a request signal transmit by a sensor. In additional or alternative aspects, the request signal can power the remote device and send instructions about when to send the response signal and what additional data to include in the response signal. The remote device can include a communication circuit that uses any wireless communication protocol including RFID, NFC, and Bluetooth. In some examples, the remote device is a badge worn by a crew member. In additional or alternative examples, the remote device is fastened to a trolley cart.

In block 404, a location of the movable object is determined based on the signal. In some aspects, determining the location of the movable object can be based on comparing when the signal was received at more than one sensor. In additional or alternative aspects, the request signal can instruct the remote device to transmit the response signal at a specific time. Determining the location of the movable object can include comparing the time at which the response signal was transmitted and the time the response signal was received at a sensor. In some aspects, the signal can include images of the movable object and the location can be determined using image processing.

In block 406, lighting in one or more sections of the aircraft is adjusted based on the location of the movable object. In some aspects, adjusting the lighting in the section of the aircraft can include activating, deactivating, brightening, dimming, changing the color, and/or changing the angle of lighting. As discussed above, the lighting can include cabin lights, overhead passenger lights, pathway lights, lavatory lights, galley lights, crew rest lights, signage, etc. In additional or alternative aspects, adjusting the lighting in the section of the aircraft can include activating lighting nearest the location of the movable object. In some aspects, the lighting can be adjusted based on additional information such as the type of the movable object and past locations of the movable object. For example, the lighting in a section of the aircraft can be adjusted differently based on the movable object being a crew member or a passenger. In additional or alternative examples, passenger lighting can be activated based on the nearby presence of a trolley cart while pathway lighting can be activated for a nearby passenger. In additional or alternative examples, lighting can be adjusted in a section of the aircraft based on the current location of the movable object while lighting in an additional section of the aircraft can be adjusted based on the past location of the movable object.

Although the process in FIG. 4 describes determining a location of the movable object based on signals received from a remote device, other implementations are possible. In some aspects, a location of the movable object can be determined based on proximity sensors detecting the movable object. In additional or alternative aspects, a location of the movable object can be determined based on image processing of images taken by a camera. Furthermore, the adjustable light system and the processes described herein can be implemented in any lighting environment including buildings or vehicles such as buses, trains, and ships.

In the following, further examples are described to facilitate the understanding of the invention:

Example #1

A system can include one or more sensors and a processing device. The one or more sensors are positionable in an aircraft for determining location data of a movable object relative to the aircraft. The processing device can be communicatively coupled to at least one sensor of the one or more sensors for receiving the location data from the at least one sensor. The processing device can further determine a location of the movable object based on the location data. And, the processing device can adjust lighting in one or more sections of the aircraft based on the location of the movable object.

Example #2

The system of any of the preceding or subsequent examples, wherein the one or more sensors each include a communication circuit for receiving a signal from a remote device coupled to the movable object.

Example #3

The system of any of the preceding or subsequent examples, further including the remote device for transmitting the signal with type data about a type of the movable object and adjusting the lighting in the section of the aircraft based on the type data.

Example #4

The system of any of the preceding or subsequent examples, wherein the type of the movable object is at least one of a passenger, a crew member, or a trolley cart.

Example #5

The system of any of the preceding or subsequent examples, wherein the signal is a response signal. Each communication circuit further transmits a request signal to the remote device for powering the remote device such that the remote device can transmit the response signal.

Example #6

The system of any of the preceding or subsequent examples, wherein the request signal instructs the remote device to transmit the response signal at a first time and the location data includes the first time and a second time at which the response signal was received by the one or more sensors.

Example #7

The system of any of the preceding or subsequent examples, wherein adjusting the lighting in the one or more sections of the aircraft includes activating a set of overhead lights above passenger seats nearest to the location of the movable object.

Example #8

The system of any of the preceding or subsequent examples, wherein adjusting the lighting in the section of the aircraft includes activating signage in a part of the aircraft nearest the location of the movable object.

Example #9

The system of any of the preceding or subsequent examples, wherein the location is a current location and the system further includes a storage device for storing a past location of the movable object and the processing device adjusts additional lighting in an additional section of the aircraft based on the current location and the past location.

Example #10

The system of any of the preceding or subsequent examples, wherein at least one sensor of the one or more sensors is a proximity sensor for detecting the location of the movable object by detecting that the movable object is proximate to the proximity sensor.

Example #11

A method includes receiving a signal from a remote device coupled to a movable object in an aircraft and determining a location of the movable object based on the signal. The method further includes adjusting lighting in a section of the aircraft based on the location of the movable object.

Example #12

The method of any of the preceding or subsequent examples, wherein the signal includes type data about a type of the movable object and the lighting in the section of the aircraft is adjusted based on the type data.

Example #13

The method of any of the preceding or subsequent examples, wherein the signal is a response signal. The method further includes transmitting a request signal to the remote device that can power the remote device such that the remote device transmits the response signal.

Example #14

The method of any of the preceding or subsequent examples, wherein the request signal instructs the remote device to transmit the response signal at a first time. The method further includes observing a second time at which the response signal is received by a receiver and determining the location of the movable object based on a difference between the first time and the second time.

Example #15

The method of any of the preceding or subsequent examples, wherein receiving the signal from the remote device includes receiving the signal by more than one receiver and determining the location of the movable object comprises comparing when the signal was received at each sensor.

Example #16

The method of any of the preceding or subsequent examples, wherein adjusting lighting in the section of the aircraft includes activating at least one of a set of overhead lights above passenger seats nearest the location of the movable object, a sign nearest the location of the movable object, or pathway lights nearest the location of the movable object.

Example #17

The method of any of the preceding or subsequent examples, further including storing the location of the movable object, and adjusting lighting in a section of the aircraft based on a past location of the movable object.

Example #18

A non-transitory computer-readable medium can have instructions stored thereon that are executable by a processing device to perform operations. The operations include determining a location of a movable object in an aircraft. The operations further include adjusting lighting in a section of the aircraft based on the location of the movable object.

Example #19

The non-transitory computer-readable medium of any of the preceding or subsequent examples, wherein the movable object is coupled to a radio-frequency identification tag and determining the location of the movable object includes receiving a signal from the radio-frequency identification tag.

Example #20

The non-transitory computer-readable medium of any of the preceding or subsequent examples, wherein the signal includes data about a type of the movable object and adjusting the lighting in the section of the aircraft is based on the data.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A system comprising:
   one or more sensors positionable in an aircraft for determining location data of a movable object relative to the aircraft; and
   a processing device communicatively coupled to at least one sensor of the one or more sensors for receiving the location data from the at least one sensor, determining a location of the movable object based on the location data, and adjusting lighting in one or more sections of the aircraft based on the location of the movable object,
   wherein the one or more sensors each comprise a communication circuit for communicating a signal between the one or more sensors and a remote device coupled to the movable object.

2. The system of claim 1, wherein at least one sensor of the one or more sensors is a proximity sensor for detecting the location of the movable object by detecting the movable object is proximate to the proximity sensor.

3. The system of claim 1, wherein the remote device is configured to transmit the signal with type data about a type of the movable object, and wherein adjusting the lighting in the one or more sections of the aircraft is further based on the type data.

4. The system of claim 3, wherein the type of the movable object is at least one of a passenger, a crew member, a trolley cart, or a robot.

5. The system of claim 1, wherein the signal is a response signal, and each communication circuit is further for transmitting a request signal to the remote device for powering the remote device such that the remote device transmits the response signal.

6. The system of claim 5, wherein the request signal is for instructing the remote device to transmit the response signal at a first time, and the location data comprises the first time and a second time at which the response signal was received by the one or more sensors.

7. The system of claim 1, wherein adjusting the lighting in the one or more sections of the aircraft comprises activating a set of overhead lights above passenger seats nearest to the location of the movable object.

8. The system of claim 1, wherein adjusting the lighting in the one or more sections of the aircraft comprises activating signage in a part of the aircraft nearest the location of the movable object.

9. The system of claim 1, wherein the location is a current location and the system further comprises a storage device for storing a past location of the movable object, and wherein the processing device is further for adjusting additional lighting in an additional section of the aircraft based on at least one of the current location and the past location.

10. A method comprising:
    receiving a signal from a remote device coupled to a movable object in an aircraft;
    determining a location of the movable object based on the signal; and
    adjusting lighting in one or more sections of the aircraft based on the location of the movable object,
    wherein the signal includes type data about a type of the movable object, and the method further comprises adjusting the lighting in the one or more sections of the aircraft is further based on the type data.

11. The method of claim 10, wherein adjusting lighting in the one or more sections of the aircraft comprises activating at least one of a set of overhead lights above passenger seats nearest the location of the movable object, a sign nearest the location of the movable object, or pathway lights nearest the location of the movable object.

12. The method of claim 11, further comprising storing the location of the movable object, and adjusting lighting in the one or more sections of the aircraft is based on a past location of the movable object.

13. The method of claim 10, wherein the signal is a response signal and the method further comprises transmitting a request signal to the remote device that powers the remote device such that the remote device transmits the response signal.

14. The method of claim 13, wherein the request signal instructs the remote device to transmit the response signal at a first time, wherein the method further comprises observing a second time at which the response signal is received by a receiver, and wherein determining the location of the movable object is further based on a difference between the first time and the second time.

15. The method of claim 10, wherein receiving the signal from the remote device comprises receiving the signal by more than one receiver, and wherein determining the location of the movable object comprises comparing when the signal was received at each sensor.

16. A non-transitory computer-readable medium having instructions stored thereon that are executable by a processing device to perform operations, the operations comprising:
    determining a location of a movable object in an aircraft; and
    adjusting lighting in one or more sections of the aircraft based on the location of the movable object,
    wherein the movable object is coupled to a radio-frequency identification tag, and determining the location of the movable object comprises receiving a signal from the radio-frequency identification tag.

17. The non-transitory computer-readable medium of claim 16, wherein the signal comprises data about a type of the movable object, and adjusting the lighting in the one or more sections of the aircraft is further based on the data.

* * * * *